(12) United States Patent
Walston

(10) Patent No.: US 10,107,119 B2
(45) Date of Patent: Oct. 23, 2018

(54) VANE ASSEMBLY FOR A GAS TURBINE ENGINE

(71) Applicant: Rolls-Royce Corporation, Indianapolis, IN (US)

(72) Inventor: Jeffrey A. Walston, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 345 days.

(21) Appl. No.: 14/995,735

(22) Filed: Jan. 14, 2016

(65) Prior Publication Data

US 2016/0215634 A1 Jul. 28, 2016

Related U.S. Application Data

(60) Provisional application No. 62/106,437, filed on Jan. 22, 2015.

(51) Int. Cl.
*F01D 9/04* (2006.01)
*F01D 5/14* (2006.01)

(52) U.S. Cl.
CPC ............... *F01D 9/041* (2013.01); *F01D 5/14* (2013.01); *F01D 5/147* (2013.01); *F05D 2220/32* (2013.01); *F05D 2230/30* (2013.01); *F05D 2240/12* (2013.01); *F05D 2240/80* (2013.01); *F05D 2300/6012* (2013.01); *F05D 2300/6033* (2013.01); *Y02T 50/672* (2013.01); *Y02T 50/673* (2013.01)

(58) Field of Classification Search
CPC . F01D 9/041; F01D 5/14; F01D 5/174; F01D 5/18; F01D 5/284; F05D 2220/32; F05D 2230/30; F05D 2240/12; F05D 2240/80; F05D 2300/6012; F05D 2300/6033; Y02T 50/672; Y02T 50/673
See application file for complete search history.

(56) References Cited

U.S. PATENT DOCUMENTS

| | | | | |
|---|---|---|---|---|
| 3,301,526 | A * | 1/1967 | Chamberlain | F01D 5/18 415/115 |
| 3,619,077 | A | 11/1971 | Wile et al. | |
| 4,270,883 | A * | 6/1981 | Corrigan | F01D 5/147 415/115 |
| 4,790,721 | A * | 12/1988 | Morris | F01D 5/187 416/241 B |
| 6,514,046 | B1 * | 2/2003 | Morrison | F01D 5/187 416/229 A |
| 7,153,096 | B2 * | 12/2006 | Thompson | F01D 5/147 415/200 |

(Continued)

OTHER PUBLICATIONS

Extended European Search Report, European Application No. 16150982.3 - 1610, dated Jun. 2, 2016, 10 pages.

*Primary Examiner* — Logan Kraft
*Assistant Examiner* — Eric Zamora Alvarez
(74) *Attorney, Agent, or Firm* — Barnes & Thornburg LLP

(57) ABSTRACT

A vane assembly for a gas turbine engine is disclosed herein. The vane assembly includes an inner platform, an outer platform, and a ceramic-containing airfoil that extends from the inner platform to the outer platform. The ceramic-containing airfoil is manufactured to have radially discontinuous ribs spaced radially apart from one another between the inner platform and the outer platform.

19 Claims, 4 Drawing Sheets

(56) References Cited

U.S. PATENT DOCUMENTS

| | | | |
|---|---|---|---|
| 7,247,003 B2* | 7/2007 | Burke | F01D 5/147 416/229 A |
| 7,255,535 B2 | 8/2007 | Albrecht et al. | |
| 7,258,530 B2 | 8/2007 | Morrison et al. | |
| 7,435,058 B2 | 10/2008 | Campbell et al. | |
| 7,452,189 B2* | 11/2008 | Shi | F01D 5/147 415/200 |
| 7,600,978 B2 | 10/2009 | Vance et al. | |
| 7,600,979 B2* | 10/2009 | Steibel | C04B 35/573 416/229 A |
| 7,887,300 B2 | 2/2011 | Mazzola et al. | |
| 8,167,537 B1 | 5/2012 | Plank et al. | |
| 8,167,573 B2 | 5/2012 | Merrill et al. | |
| 8,210,803 B2* | 7/2012 | Schaff | F01D 5/147 415/200 |
| 8,235,670 B2 | 8/2012 | Morrison et al. | |
| 2006/0120874 A1 | 6/2006 | Burke et al. | |
| 2006/0121265 A1 | 6/2006 | Thompson et al. | |
| 2007/0140835 A1 | 6/2007 | Albrecht et al. | |
| 2010/0166565 A1 | 7/2010 | Uskert et al. | |
| 2013/0142660 A1* | 6/2013 | McCaffrey | F01D 5/147 416/241 B |
| 2015/0369052 A1* | 12/2015 | de Diego | F01D 5/282 416/229 A |

\* cited by examiner

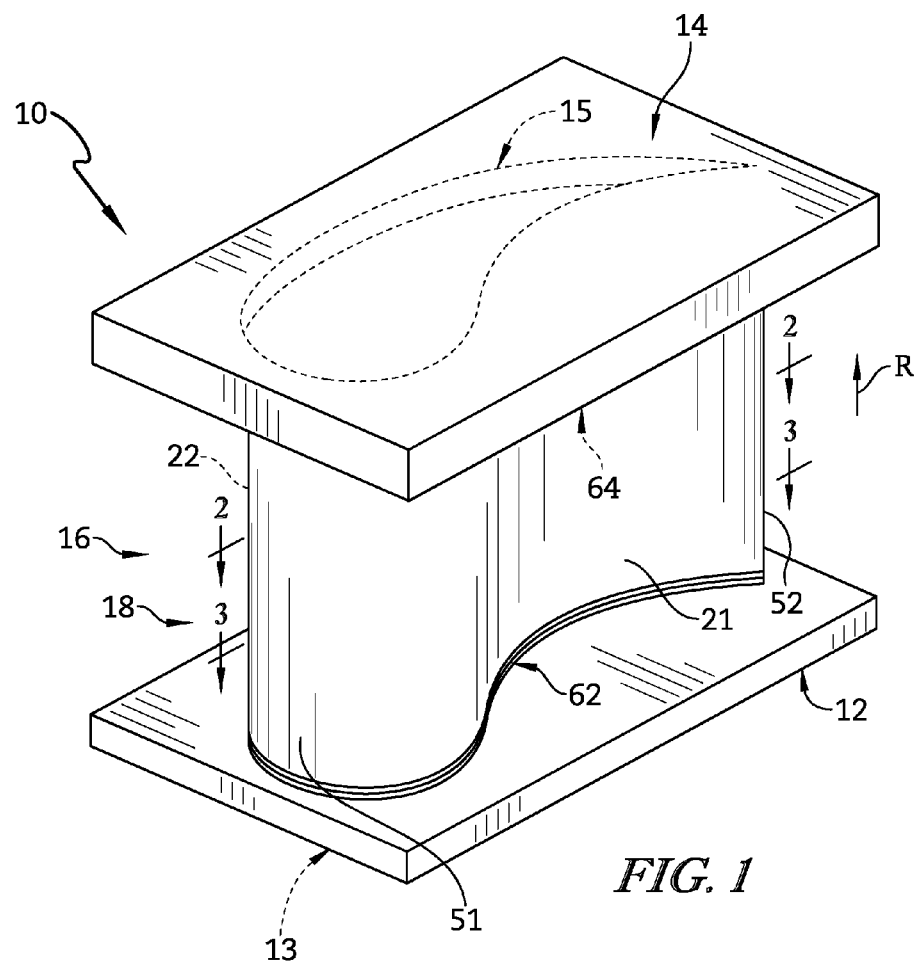
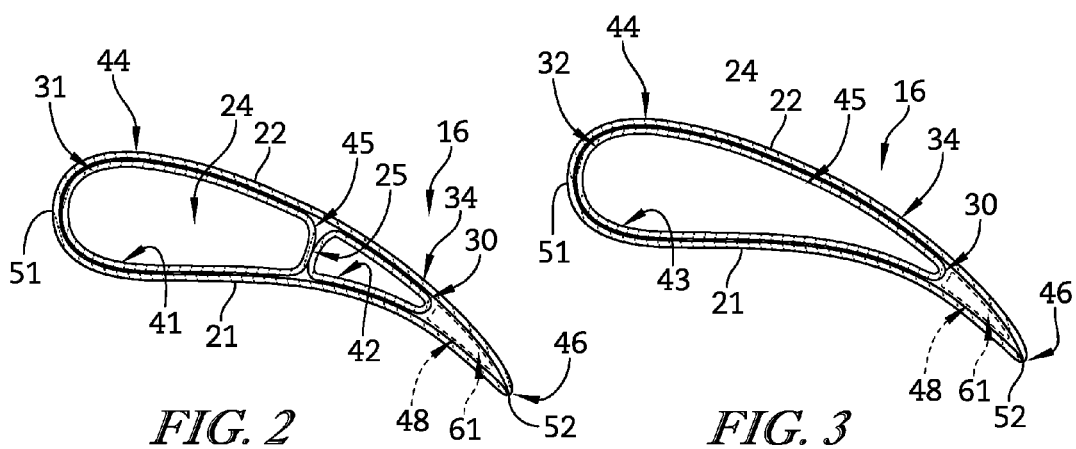

VANE ASSEMBLY FOR A GAS TURBINE ENGINE

CROSS REFERENCE TO RELATED APPLICATIONS

This application claims priority to and the benefit of U.S. Provisional Patent Application No. 62/106,437, filed 22 Jan. 2015, the disclosure of which is now expressly incorporated herein by reference.

FIELD OF THE DISCLOSURE

The present disclosure relates generally to vanes used in gas turbine engines, and more specifically to vanes used in gas turbine engines that contain composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades. To this end, some airfoils for vanes and blades are incorporating composite materials adapted to withstand very high temperatures. Design and manufacture of vanes and blades from composite materials presents challenges because of the geometry and strength required for the parts.

SUMMARY

The present disclosure may comprise one or more of the following features and combinations thereof.

A vane assembly for a gas turbine engine may include an inner platform, an outer platform spaced apart from the inner platform to define a gas path therebetween, and a ceramic-matrix composite airfoil that extends from the inner platform to the outer platform across the gas path. The ceramic-matrix composite airfoil may be formed to include a pressure side, a suction side, and a plurality of ribs spaced radially apart from one another between the inner platform and the outer platform that interconnect the pressure side with the suction side.

In illustrative embodiments, the ceramic-matrix composite airfoil may include a core having a plurality of rib-containing sections and at least one hollow section stacked radially on top of one another to form the plurality of ribs. The ceramic-matrix composite airfoil may include an overwrap that wraps around the core to form the pressure side and the suction side of the airfoil.

In illustrative embodiments, each of the rib-containing sections includes a first tube of ceramic-containing reinforcement. The first tube of ceramic-containing reinforcement included in one of the rib-containing sections may be woven or braided so that the first tube of ceramic-containing reinforcement does not have a seam that extends radially between the inner platform and the outer platform.

In illustrative embodiments, the rib containing sections may include a second tube of ceramic-containing reinforcement. The second tube of ceramic-containing reinforcement may be arranged axially adjacent to the first tube of ceramic-containing reinforcement in contact with the first tube of ceramic-containing reinforcement.

In illustrative embodiments, each of the hollow sections may include a tube of ceramic-containing reinforcement. The tube of ceramic-containing reinforcement included in each of the hollow sections may be woven or braided so that the tube of ceramic-containing reinforcement does not have a seam that extends radially between the inner platform and the outer platform.

In illustrative embodiments, the rib-containing sections and the hollow sections may form interfaces that extend between a leading edge and a trailing edge of the airfoil. In some embodiments, the interfaces may define interface angles with the inner platform. In some embodiments, the interfaces may define at least a portion of a wave between the leading edge and the trailing edge of the airfoil.

According to another aspect of the present disclosure, a ceramic-matrix composite airfoil adapted for use in a gas turbine engine may include a core and an overwrap. The overwrap may wrap around the core to form the pressure side and the suction side of the airfoil.

In illustrative embodiments, the core may include a plurality of rib-containing sections. The plurality of rib-containing sections may be stacked radially relative to one another to form a plurality of ribs that extend from a pressure side of the airfoil to a suction side of the airfoil and that are radially spaced apart from one another.

In illustrative embodiments, the rib-containing sections may form interfaces with radially-adjacent sections of the core that extend between a leading edge and a trailing edge of the airfoil. In some embodiments, the interfaces may that define interface angles with the inner platform. In some embodiments, the interfaces may define at least a portion of a wave between the leading edge and the trailing edge of the airfoil.

In illustrative embodiments, the core may include at least one hollow section. The hollow section may be stacked radially between rib-containing sections to space the ribs if the rib-containing sections radially apart from one another.

In illustrative embodiments, rib-containing sections and at least one hollow section may form interfaces that extend between a leading edge and a trailing edge of the airfoil. In some embodiments, the interfaces may define interface angles with the inner platform. In some embodiments, the interfaces may define at least a portion of a wave between the leading edge and the trailing edge of the airfoil.

In illustrative embodiments, each of the hollow sections may include a tube of ceramic-containing reinforcement. The tube of ceramic-containing reinforcement included in each of the hollow sections may not have a seam that extends radially between the inner platform and the outer platform.

In illustrative embodiments, each of the rib-containing sections may include a first tube of ceramic-containing reinforcement and a second tube of ceramic-containing reinforcement. The second tube of ceramic-containing reinforcement may be arranged axially adjacent to the first tube of ceramic-containing reinforcement between a leading edge and a trailing edge of the airfoil and may be in contact with the first tube of ceramic-containing reinforcement.

In illustrative embodiments, the first tube of ceramic-containing reinforcement and the second tube of ceramic-containing reinforcement included in one of the rib-containing sections may not have a seam that extends radially between the inner platform and the outer platform.

According to another aspect of the present disclosure, a method of making a ceramic-matrix composite airfoil for use in a gas turbine engine is disclosed. The method may include co-processing a core and an overwrap to bond the core and the overwrap with ceramic matrix material.

In illustrative embodiments, the method may include stacking a plurality of rib-containing sections and a plurality of hollow sections radially on top of one another to form a core having a plurality of ribs spaced radially apart from one another. The method may also include wrapping the overwrap around the core to define a pressure side and a suction side of the airfoil that are interconnected by the plurality of ribs.

In illustrative embodiments, each of the rib-containing sections may be formed by arranging a first tube of ceramic-containing reinforcement material adjacent to a second tube of ceramic-containing reinforcement material so that the first tube of ceramic-containing reinforcement material is in contact with the second tube of ceramic-containing reinforcement material.

These and other features of the present disclosure will become more apparent from the following description of the illustrative embodiments.

BRIEF DESCRIPTION OF THE DRAWINGS

FIG. 1 is perspective view of a vane assembly adapted for use in a gas turbine engine showing that the vane assembly includes an inner platform, an outer platform, and an airfoil that extends from the inner platform to the outer platform;

FIG. 2 is a cross sectional view of the airfoil shown in FIG. 1 taken at line 2-2 showing that the airfoil includes an outer wrap that forms a pressure side and a suction side of the airfoil and a core having a first section that forms a first rib extending from the pressure side to the suction side at a selected radial location between the inner platform and the outer platform;

FIG. 3 is a cross sectional view of the airfoil shown in FIG. 1 taken at line 3-3 showing that the core has a second section that does not form a rib so that the first rib formed by the first section is radially discontinuous and does not extend all the way from the inner platform to the outer platform;

DETAILED DESCRIPTION OF THE DRAWINGS

Figure 4:
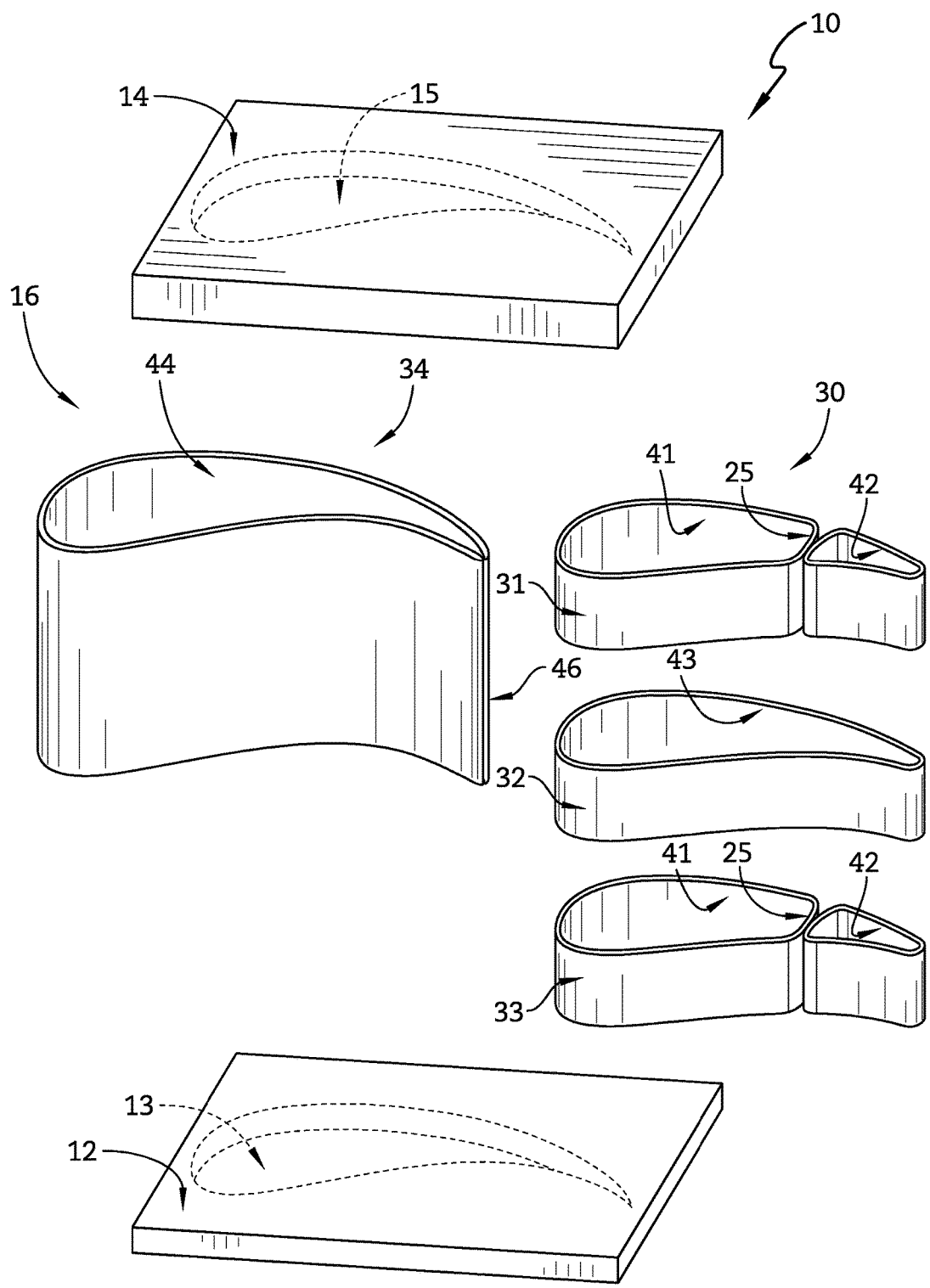
FIG. 4 is an exploded perspective assembly view of the vane assembly of FIGS. 1-3 showing that the core includes a plurality of sections that form ribs and a plurality of sections that do not form ribs so that when the sections are stacked a plurality of radially discontinuous ribs are formed by the core.
Figure 5:
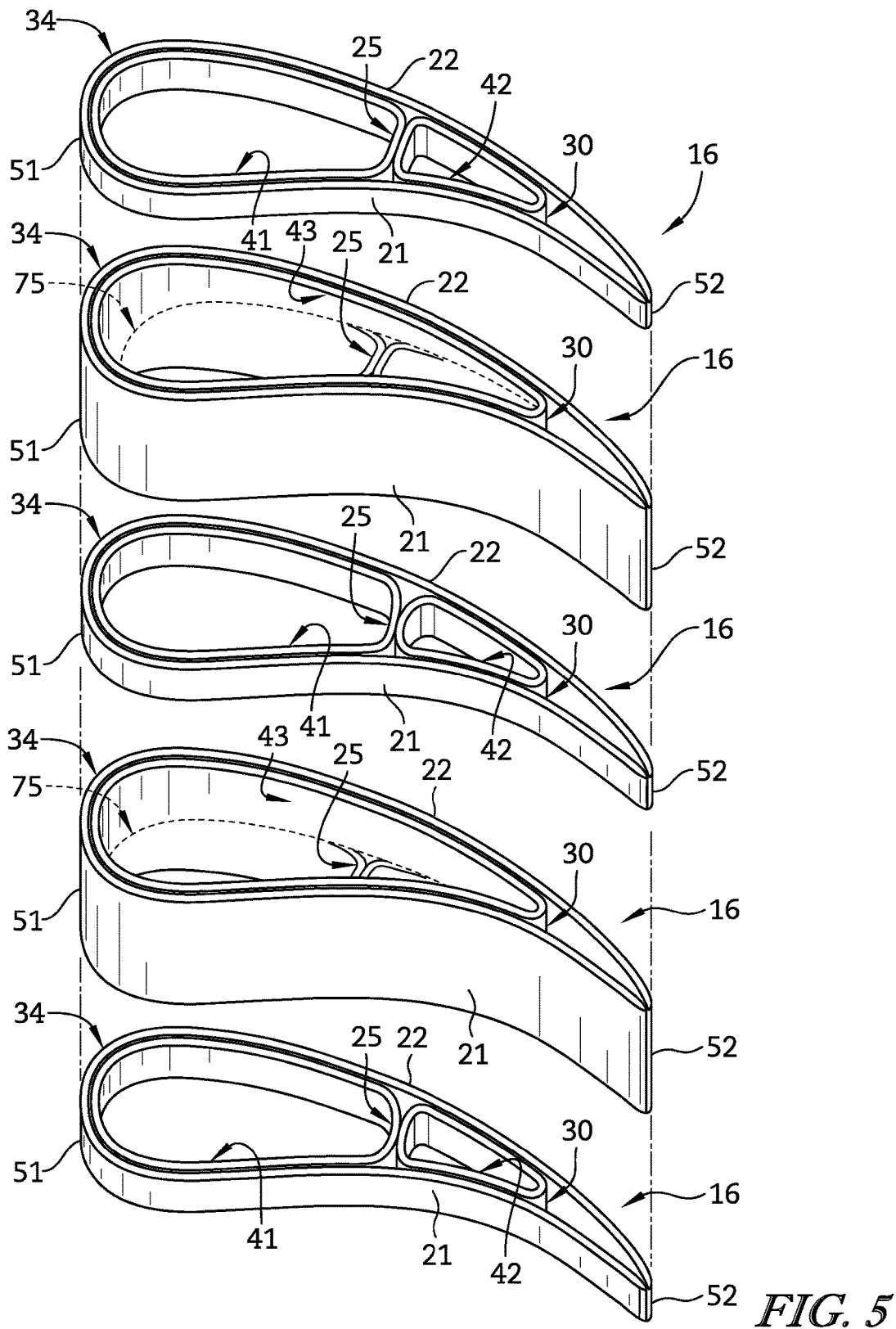
FIG. 5 is a cross sectional view of a plurality of airfoils of the type shown in FIGS. 1-4 with the sections taken at different radial locations between inner and outer platforms to show that the ribs of the airfoils are discontinuous between the inner and outer platforms.

For the purposes of promoting an understanding of the principles of the disclosure, reference will now be made to a number of illustrative embodiments illustrated in the drawings and specific language will be used to describe the same.

An illustrative turbine vane assembly 10 for use in a gas turbine engine is shown in FIG. 1. The turbine vane 10, sometimes simply called a turbine vane or vane 10, includes an inner platform 12, an outer platform 14, and an airfoil 16. The inner platform 12 and outer platform 14 are spaced apart in a radial direction R from one another and cooperate to define a flow path 18 for hot high pressure gasses moving through the turbine section of a gas turbine engine. The airfoil 16 extends in the radial direction R from the inner platform 12 to the outer platform 14 across the flow path 18 to interact with hot gasses moving through the flow path 18.

The airfoil 16 illustratively comprises ceramic-matrix composite materials adapted to withstand high temperatures and is shaped to redirect hot gasses before those gasses act on rotating blades arranged aft of the airfoil 16 as suggested in FIG. 1. The airfoil 16 is formed to include a pressure side 21, a suction side 22, and a plurality of ribs 25 that extend through an interior 24 of the airfoil 16 as shown in FIG. 2. The ribs 25 are illustratively spaced radially apart from one another between the inner platform 12 and the outer platform 14 while remaining axially aligned as suggested in FIGS. 2 and 3.

The illustrative airfoil includes a core 30 and an overwrap 34 as shown in FIG. 4. The core 30 has a plurality of rib-containing sections 31, 33 and a hollow section 32 stacked or sandwiched between the rib-containing sections 31, 33 to form the plurality of radially-discontinuous ribs 25. The overwrap 34 wraps around the core 30 to hold the core 30 together and to form the pressure side 21 and the suction side 22 of the airfoil 16.

The rib-containing sections 31, 33 of the core 30 each includes a first tube 41 of ceramic-containing reinforcement and a second tube 42 of ceramic-containing reinforcement as shown in FIGS. 2 and 4. The first tube 41 and the second tube 42 are arranged axially adjacent to one another between a leading edge 51 and a trailing edge 52 of the airfoil 16 so that they contact one another forming a rib 25 along the region of contact.

In the illustrative embodiment, the first tube 41 and the second tube 42 are woven or braided socks of ceramic-containing material so that they do not have a seam that extends radially between the inner platform 12 and the outer platform 14. In other embodiments, the first tube 41 and the second tube 42 may be formed from wrapped plies or sheets of ceramic-containing material that have a seam or seams extending radially between the inner platform 12 and the outer platform 14. Both the first tube 41 and the second tube 42 are suspended in a ceramic-matrix 45 when assembled into the airfoil 16.

Two rib-containing sections 31, 33 separated by a single hollow section 32 are shown in the exemplary embodiment of FIGS. 1-4. In some embodiments, more rib-containing sections separated by more hollow sections may be included in the core 30 to provide more radially-discontinuous ribs 25. In some embodiments, each rib-containing section may include more than two tubes of ceramic-containing reinforcement contacting one another to form additional ribs that interconnect the pressure side 21 and the suction side 22 of the airfoil 16 at various locations between the leading edge 51 and the trailing edge 52 of the airfoil 16. In some embodiments, two or more tubes of the rib-containing sections may not contact one another and may form ribs that interconnect the pressure side 21 and the suction side 22 of the airfoil 16 at various locations between the leading edge 51 and the trailing edge 52 of the airfoil 16.

The hollow sections 32 of the core 30 includes a tube 43 of ceramic-containing reinforcement an as shown in FIGS. 3 and 4. In the illustrative embodiment, the tube 43 is a woven or braided sock of ceramic-containing material so that it does not have a seam that extends radially between the inner platform 12 and the outer platform 14. In other embodiments, the tube 41 may be formed from wrapped plies or sheets of ceramic-containing material that have a seam (or seams) extending radially between the inner platform 12 and the outer platform 14. The tube 43 is suspended in the ceramic-matrix 45 when assembled into the airfoil 16.

In some embodiments, the hollow section 32 may be omitted and the rib-containing sections 31, 32 may be radially spaced apart and supported by the overwrap 34 or by another support structure included in the core 30. In some embodiments, the hollow section 32 may be replaced by a rib-containing section having a rib (or ribs) offset axially from the rib(s) of axially adjacent rib-containing sections. Accordingly, the core 30 may form radially discontinuous ribs using various combinations of rib-containing and/or hollow sections.

The overwrap 34 illustratively includes one or more plies 44 of ceramic-containing reinforcement that wraps around the core 30 as shown in FIGS. 2-4. The plies (sometimes called sheets) 44 of ceramic-containing reinforcement is shown wrapped from the trailing edge 52 of the airfoil 16 around the leading edge 51 of the airfoil 16 so that a seam 46 of the overwrap 34 is located at the trailing edge 52. In some embodiments, the seam 46 of the overwrap 34 may be located elsewhere or the overwrap 34 may include a woven or braided tube of ceramic-containing material without a radially-extending seam. The plies 44 are suspended in the ceramic-matrix 45 when assembled into the airfoil 16.

A filler 48 may be arranged between the seam 46 of the plies 44 included in the overwrap 34 at the trailing edge 52 of the airfoil 16 and the core 30 as shown in FIGS. 2 and 3. The filler 48, sometimes called a noodle, may comprise chopped fiber or other types of ceramic-containing reinforcement suspended in the ceramic matrix 45.

In the illustrative embodiment, the inner platform 12 and the outer platform 14 comprise ceramic materials adapted to withstand high temperatures. Each of the inner and the outer platforms 12, 14 may be formed to include a corresponding aperture 13, 15 adapted to allow entry and exit of cooling air into and out of the interior 24 of the core 30. Each of the inner and the outer platforms 12, 14 are illustratively coupled to the airfoil 16 by a corresponding bi-cast joint 62, 64.

In some embodiments, one or both of the inner platform 12 and the outer platform 14 may be made from a metallic material, such as, for example, a nickel-based or cobalt-based super alloy (e.g. Inconel, Waspaloy, etc.). In some such embodiments, the airfoil 16 may be received in an aperture formed in the metallic inner and/or the metallic outer platforms. This arrangement may be designed allow the airfoil 16 to expand and contract at a rate different from that of the metallic inner and/or the metallic outer platforms.

As suggested in FIG. 4, each section 31, 32, 33 of the core 30 included in the exemplary embodiment have a similar and consistent height extending between the inner platform 12 and the outer platform 14. Accordingly, interfaces 75 formed between the rib-containing sections 31, 33 and the hollow section 32 of the core 30 extend substantially parallel to the inner platform 12 and the outer platform 14 in the axial direction between the leading edge 51 and the trailing edge 52 of the airfoil 16. In some embodiments, the height of the rib-containing sections 31, 33 may be shorter or taller in height between the inner platform 12 and the outer platform 14 than the hollow sections 32.

According to the present disclosure, the airfoil 16 is formed of discrete sections 31, 32, 33, laid up individually and then stacked and finally wrapped with a continuous exterior wrap 34 to assemble them before being sent through the chemical vapor deposition process. Sections 31, 32, 33 alternate between having a rib and not, with the final outcome being a non-continuous rib 25 in the radial direction as shown in the embodiment of FIGS. 1-4.

The exemplary turbine vane assembly 10 is shown as a singlet, having one airfoil that extends between the inner platform 12 and the outer platform 14 as shown in FIG. 1. In some embodiments, a turbine vane assembly in accordance with the present disclosure may be a doublet or multi-airfoil segment, having two or more airfoils that extend between the inner platform and the outer platform. In some embodiments, a turbine vane assembly in accordance with the present disclosure may be a full ring, having an inner and/or outer platform that forms a full hoop with multiple airfoils arranged radially between the inner and outer platforms and spaced circumferentially around the full hoop(s). In some embodiments, the vane assembly 10 disclosed herein may be used in the compressor section of a gas turbine engine upon a design need for high temperature capability in the compressor.

In illustrative applications, the airfoil 16 disclosed herein may be also be incorporated into a blade for a gas turbine engine. In such applications, the outer platform 14 may be replaced by a blade tip and/or a blade shroud coupled to the airfoil 16. Further, a root and/or other attachment feature may be coupled to the airfoil 16 and/or the inner platform 12 to allow coupling of the airfoil 16 to a turbine disk for rotation therewith. It is also contemplated, in turbine blade applications, that the airfoil 16 may be integrally formed with a disk or ring to form part of a blisk or bling assembly.

One specific method of making the vane assembly 10 may include forming the core 30 and wrapping the overwrap 34 around the core 30 as suggested in FIGS. 1-4. The method may further include co-processing the core 30 and the overwrap 34 to bond the core and the overwrap with ceramic matrix material 45.

Forming the core 30 may be performed by stacking a plurality of rib-containing sections 31, 33 and the hollow section 32 radially on top of one another with the hollow section 32 between the rib containing sections 31, 33 as suggested in FIG. 4. This stacking illustratively results in the core 30 having a plurality of ribs 25 spaced radially apart from one another.

Each of the rib-containing sections 31, 33 may be formed by arranging a first tube 41 of ceramic-containing reinforcement material adjacent to a second tube 42 of ceramic-containing reinforcement material. The first tube 41 of ceramic-containing reinforcement material may contact the second tube 42 of ceramic-containing reinforcement material so that ribs 25 are formed by contacting portions of the first tube 41 and the second tube 42.

Wrapping the overwrap 34 around the core 30 may include placing one end of plies 44 along the trailing edge 52 of the airfoil 16 and guiding the plies 44 around the leading edge 51 of the airfoil 16 back to the trailing edge 52 of the airfoil 16 as suggested in FIGS. 2 and 3. The overwrap 34 thus defines the pressure side 21 and the suction side 22 of the airfoil 16. The pressure side 21 and the suction side 22 of the airfoil 16 are interconnected by the plurality of ribs 25.

The method may also include placing reinforcement fibers 61 (chopped or otherwise) into a space created between the trailing edge 52 of the airfoil 16 defined by the overwrap 34 and the core 30. These reinforcement fibers 61 may become filler 48 upon co-processing with the core 30 and the overwrap 34.

Co-processing may include co-infiltration of the core 30 and the overwrap 34. Co-infiltration illustratively includes densifying preforms of the core 30 and the overwrap 34. Densifying preforms of the core 30 and the overwrap 34 may include CVD or CVI, slurry infiltration, and/or melt infiltration. In some embodiments, some CVD or CVI may be applied to the preform of the core 30 ahead of wrapping the overwrap 34 around the core 30.

CVD or CVI may be used to build up one or more layers on the ceramic fibers included in preforms of the core 30 and the overwrap 34. The one or more layers may include a silicon carbide layer. Furthermore, an intermediate layers such as boron nitride may be deposited prior to the silicon carbide layer. CVD may follow the same thermodynamics and chemistry. CVI and CVD may be non-line of sight processes such that CVI and CVD may occur completely within a furnace. The starting material for CVI may include a gaseous precursor controlled by quartz tubes and may be performed at temperatures between about 900° C. and about 1300° C. CVI may be performed at relatively low pressure and may use multiple cycles in the furnace. Silicon carbide may also be deposited to build up one or more layers on the fibers while the preform is in the furnace. The silicon carbide may provide additional protection to the fibers and may also increase the stiffness of the airfoil preform fibers and the tip preform. In some embodiments, boron nitride may be deposited prior the silicon carbide to provide further beneficial mechanical properties to the fibers.

Preforms of the core 30 and/or the overwrap 34 may be taken out of the furnace after a first pass through the furnace and weighed. If the preform is not at the target weight it may go through the furnace for another run, which may occur as many times as necessary in order to achieve the target weight. The target weight may be determined by the final part to be made. CVI or CVD may form a preform with a porosity of between about 40% and about 50%. If the preforms of the core 30 and the overwrap 34 are at the target weight the parts may undergo slurry infiltration.

Once preform fibers of the core 30 and the overwrap 34 are coated via CVI or CVD, additional particles may be infiltrated into the preforms concurrently via other infiltration methods. For example, a slurry infiltration process may include infiltrating the preforms with slurry. Dispersing the slurry throughout the preforms may include immersing the preforms in the slurry composition. The slurry may include particles of carbon and optionally silicon carbide. The slurry may flow into the spaces, pores, or openings between the fibers of the preforms such that the slurry particles may uniformly impregnate the pores of the preform and reside in the interstices between the preform fibers. The slurry infiltration process may form preforms with a porosity of between about 35% and about 45%.

Prior to immersion, the preform fibers may optionally be prepared for slurry infiltration by exposing the fibers to a solution including, for example, water, solvents, surfactants and the like to aid impregnation of the fibers. Optionally, a vacuum may be drawn prior to slurry introduction to purge gas from the preforms and further enhance impregnation. Slurry infiltration may be conducted at any suitable temperature such as at room temperature (about 20° C. to about 35° C.). The slurry infiltration may be enhanced by application of external pressure after slurry introduction such as at one atmosphere pressure gradient.

After slurry infiltration, preforms of the core 30 and the overwrap 34 may undergo melt infiltration. During melt infiltration a molten metal or alloy may wick between the openings of the preforms. In various embodiments, the molten metal or alloy may have composition that includes silicon, boron, aluminum, yttrium, titanium, zirconium, oxides thereof, and mixtures and combinations thereof. In some instances, graphite powder may be added to assist the melt infiltration. The molten metal or alloy may wick into the remaining pores of the preform through capillary pressure. For example, molten silicon metal may wick into the pores and form silicon carbide to create a matrix between the fibers resulting in a relatively dense core 30 and overwrap 34 compared to the preforms. For example, after the preforms have been densified, the core 30 and the overwrap 34 may have a porosity of between about 1 percent and about 10 percent by volume.

In one example, a temperature for infiltration of silicon may be between about 1400° C. and about 1500° C. The duration of the infiltration may be between about 15 minutes and 4 hours. The infiltration process may optionally be carried out under vacuum, but in other embodiments melt infiltration may be carried out with an inert gas under atmospheric pressure to limit evaporation losses. The co-infiltration processes described herein may create the airfoil 16 in which the core 30 and the overwrap 34 are a continuous structure.

In some examples a preform of the airfoil 16 may formed by chemical vapor infiltration. In other examples, the preform of the airfoil 16 may be formed by a combination of chemical vapor infiltration, melt infiltration, polymer-infiltration-pyrolysis. In other examples, the preform of the airfoil 16 may be formed by a combination of chemical vapor infiltration and polymer-infiltration-pyrolysis.

Figure 6:
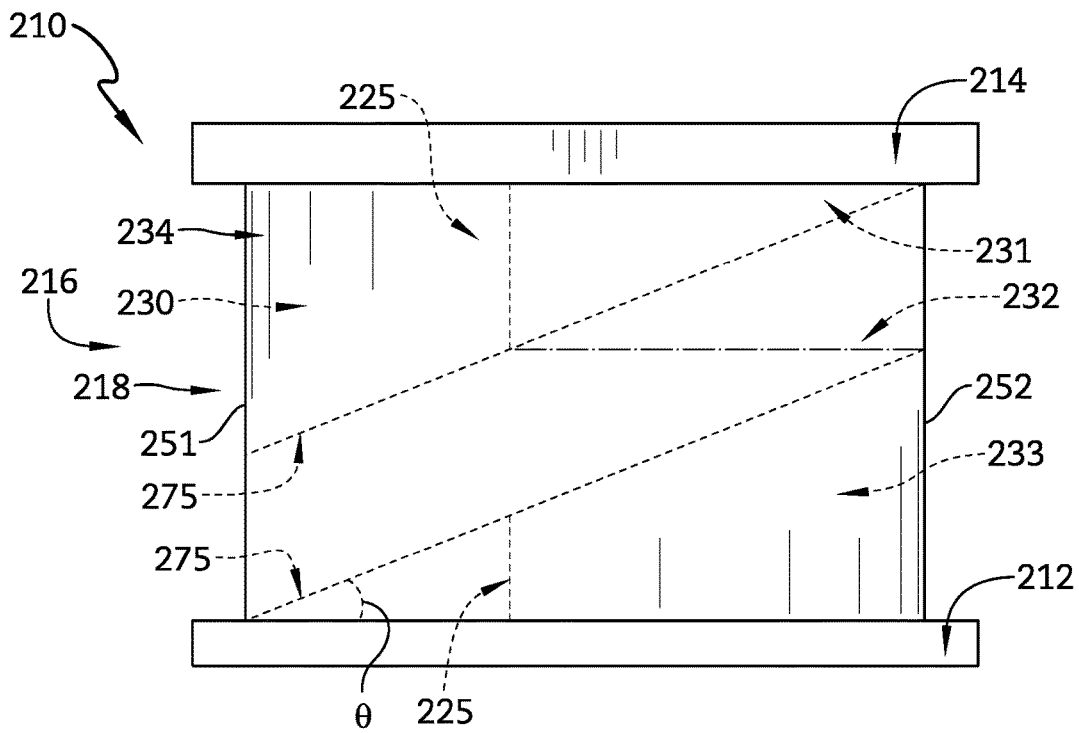
FIG. 6 is a side elevation view of a second vane assembly similar to the airfoil of FIGS. 1-4 showing that sections of a core included in the airfoil of the vane assembly shown in FIG. 6 are cut so that interfaces of the sections of the core form an angle with the inner platform between a leading edge and a trailing edge of the airfoil.

Another illustrative vane assembly 210 adapted for use in a gas turbine engine is shown in FIG. 6. The vane assembly 210 is substantially similar to the vane assembly 10 shown in FIGS. 1-4 and described herein. Accordingly, similar reference numbers in the 200 series indicate features that are common between the vane assembly 10 and the vane assembly 210. The description of the vane assembly 10 is hereby incorporated by reference to apply to the vane assembly 210, except in instances when it conflicts with the specific description and drawings of the vane assembly 210.

Unlike the vane assembly 10, each section 231, 232, 233 of a core 230 included in the exemplary vane assembly 210 are cut to form interfaces 275 that define interface angles θ with an inner platform 212 as shown in FIG. 6. The angle θ is defined between the plane of the inner platform and the interfaces 275 as the sections 231, 232, 233 extend between a leading edge 251 and a trailing edge 252 of an airfoil 216. Consequently, in the illustrative embodiment, the radially-outermost and the radially-innermost sections 231, 233 have a changing height extending between the inner platform 212 and the outer platform 214. The radially-central section 232 illustratively has a constant height extending between the inner platform 212 and the outer platform 214.

The angled pattern or radial sweep of the sections 231, 232, 233 may reduce weakness at the interfaces or division lines 275 by providing out of plane strength to the airfoil 216 structure. It is contemplated that if the sheared over sections are produced with a 0/90 layup, when they are stacked, fiber orientations (or angle θ) may effectively become +/−45. In such a configuration, ballooning and/or aerodynamically induced stresses may be shared among components of the airfoil 16 in a desirable fashion. However, other layup and fiber orientations are also contemplated and fall within the scope of the present disclosure.

Another illustrative vane assembly 310 adapted for use in a gas turbine engine is shown in FIG. 6. The vane assembly 310 is substantially similar to the vane assembly 10 shown in FIGS. 1-4 and described herein. Accordingly, similar reference numbers in the 300 series indicate features that are common between the vane assembly 10 and the vane assembly 310. The description of the vane assembly 10 is hereby incorporated by reference to apply to the vane assembly 310, except in instances when it conflicts with the specific description and drawings of the vane assembly 310.

Figure 7:
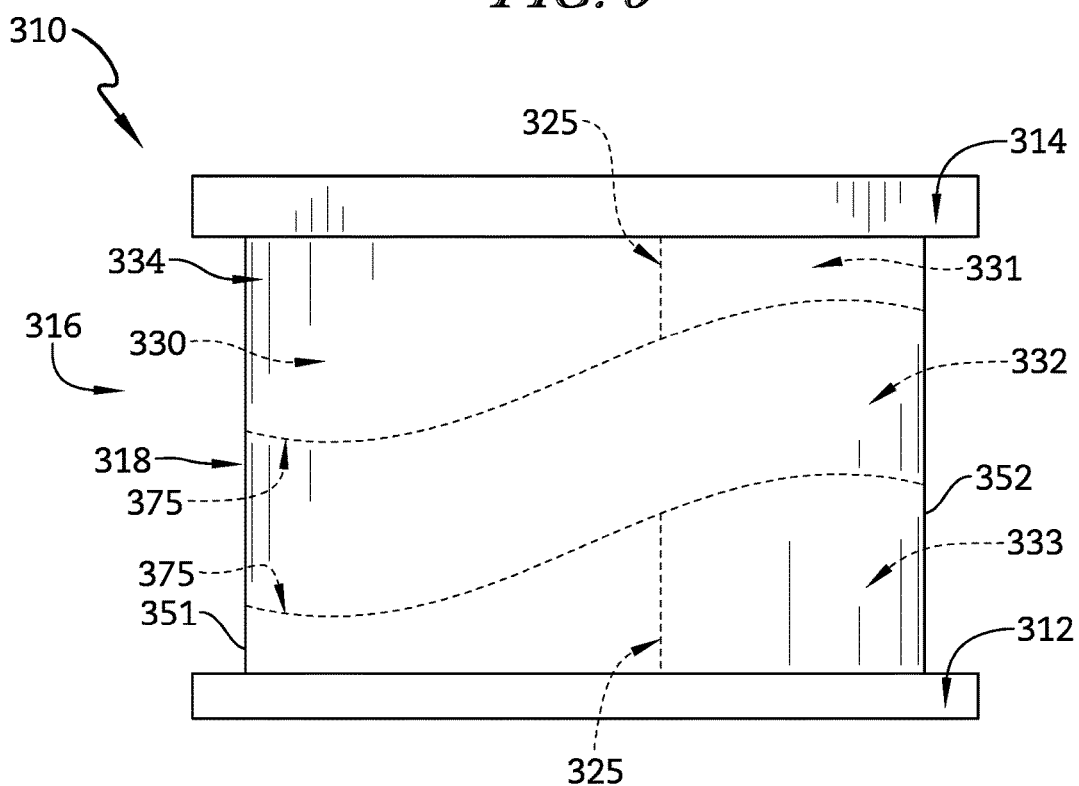
FIG. 7 is a side elevation view of a third vane assembly similar to the airfoil of FIGS. 1-4 showing that sections of a core included in the airfoil of the vane assembly shown in FIG. 7 are cut so that interfaces of the sections of the core form a sinusoidal wave portion between a leading edge and a trailing edge of the airfoil.

Unlike the vane assembly 10, each section 331, 332, 333 of a core 330 included in the exemplary vane assembly 310 are cut to form interfaces 375 that form a portion of a sinusoidal wave as shown in FIG. 7. Consequently, in the illustrative embodiment, the radially-outermost and the radially-innermost sections 331, 333 have a changing height extending between the inner platform 312 and the outer platform 314. The radially-central section 332 illustratively has a constant height extending between the inner platform 312 and the outer platform 314. The sine wave pattern of the sections 331, 332, 333 may reduce weakness at the interfaces or division lines 375 by providing out of plane strength to the airfoil 316 structure. In some embodiments, the interfaces 375 may have other non-linear and/or partial wave shapes. In other embodiments, other non-linear and/or non-planar geometries may be incorporated into the interfaces 375.

Ceramic-matrix composite materials (CMCs) provide high temperature capability, low density, and low creep at high temperatures when compared to contemporary alloys. These features make manufacturing turbine components out of CMCs an attractive concept; however, this must be done with care to accommodate the lower strength of CMCs versus metallic solutions. When constructing a CMC airfoil shape for use as a vane, for example, the out of plane stress applied to the material at the leading edge and trailing edge can become prohibitively high due to ballooning loads. One solution to this problem is to manufacture a rib in close proximity to the trailing edge to reduce the loading taken by the fibers wrapping the tight trailing edge radius. However, the rib is then subjected to a thermal stress due to the differential heating of the pressure side and suction side. This leads to desiring a rib that is not continuous in the radial direction to allow for finite sections of the airfoil to expand and contract as needed. The manufacture of an airfoil as here so far described out of fabric layup is a non-trivial problem to which the concepts herein provide a solution.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane assembly for a gas turbine engine, the assembly comprising
    an inner platform and an outer platform spaced apart from the inner platform to define a gas path therebetween, and
    a ceramic-matrix composite airfoil that extends from the inner platform to the outer platform across the gas path, the ceramic-matrix composite airfoil formed to include a pressure side, a suction side, and a plurality of ribs spaced radially apart from one another between the inner platform and the outer platform that interconnect the pressure side with the suction side,
    wherein the ceramic-matrix composite airfoil includes (i) a core having a plurality of rib-containing sections and at least one hollow section stacked radially on top of one another to form the plurality of ribs, and (ii) an overwrap that wraps around the core to form the pressure side and the suction side of the airfoil,
    wherein the rib-containing sections form interfaces that are non-planar with radially-adjacent sections of the core that extend between a leading edge and a trailing edge of the airfoil.

2. The assembly of claim 1, wherein each of the rib-containing sections includes a first tube of ceramic-containing reinforcement.

3. The assembly of claim 2, wherein the first tube of ceramic-containing reinforcement included in one of the rib-containing sections is woven or braided so that the first tube of ceramic-containing reinforcement does not have a seam that extends radially between the inner platform and the outer platform.

4. The assembly of claim 2, wherein the rib containing sections include a second tube of ceramic-containing reinforcement arranged axially adjacent to the first tube of ceramic-containing reinforcement in contact with the first tube of ceramic-containing reinforcement.

5. The assembly of claim 1, wherein each of the hollow sections includes a tube of ceramic-containing reinforcement.

6. The assembly of claim 5, wherein the tube of ceramic-containing reinforcement included in each of the hollow sections is woven or braided so that the tube of ceramic-containing reinforcement does not have a seam that extends radially between the inner platform and the outer platform.

7. The assembly of claim 1, wherein the rib-containing sections and the hollow sections form the interfaces that extend between a leading edge and a trailing edge of the airfoil and define interface angles with the inner platform.

8. The assembly of claim 1, wherein rib-containing sections and the hollow sections form the interfaces that extend between a leading edge and a trailing edge of the airfoil and define at least a portion of a wave between the leading edge and the trailing edge of the airfoil.

9. A ceramic-matrix composite airfoil adapted for use in a gas turbine engine, the airfoil comprising
    a core including a plurality of rib-containing sections stacked radially relative to one another to form a plurality of ribs that extend from a pressure side of the airfoil to a suction side of the airfoil and that are radially spaced apart from one another, wherein the rib-containing sections form interfaces that are non-planar with radially-adjacent sections of the core that extend between a leading edge and a trailing edge of the airfoil, and an overwrap that wraps around the core to form the pressure side and the suction side of the airfoil.

10. The airfoil of claim 9, wherein the interfaces define interface angles with the inner platform.

11. The airfoil of claim 9, wherein the interfaces define at least a portion of a wave between the leading edge and the trailing edge of the airfoil.

12. The airfoil of claim 9, wherein the core includes at least one hollow section stacked radially between rib-containing sections to space the ribs of the rib-containing sections radially apart from one another.

13. The assembly of claim 12, wherein rib-containing sections and the at least one hollow section form the interfaces that extend between a leading edge and a trailing edge of the airfoil and define interface angles with the inner platform.

14. The assembly of claim 12, wherein rib-containing sections and the at least one hollow section form the interfaces that extend between a leading edge and a trailing edge of the airfoil and define at least a portion of a wave between the leading edge and the trailing edge of the airfoil.

15. The airfoil of claim 12, wherein each of the hollow sections includes a tube of ceramic-containing reinforcement.

16. The airfoil of claim 15, wherein the tube of ceramic-containing reinforcement included in each of the hollow sections does not have a seam that extends radially between the inner platform and the outer platform.

17. The airfoil of claim 9, wherein each of the rib-containing sections includes a first tube of ceramic-containing reinforcement and a second tube of ceramic-containing reinforcement, the second tube of ceramic-containing reinforcement arranged axially adjacent to the first tube of ceramic-containing reinforcement between a leading edge and a trailing edge of the airfoil and in contact with the first tube of ceramic-containing reinforcement.

18. The airfoil of claim 17, wherein the first tube of ceramic-containing reinforcement and the second tube of ceramic-containing reinforcement included in one of the rib-containing sections do not have a seam that extends radially between the inner platform and the outer platform.

19. A method of making a ceramic-matrix composite airfoil for use in a gas turbine engine, the method comprising
stacking a plurality of rib-containing sections and a plurality of hollow sections radially on top of one another to form a core having a plurality of ribs spaced radially apart from one another,
wrapping an overwrap around the core to define a pressure side and a suction side of the airfoil that are interconnected by the plurality of ribs, and
co-processing the core and the overwrap to bond the core and the overwrap with ceramic matrix material,
wherein each of the rib-containing sections are formed by arranging a first tube of ceramic-containing reinforcement material adjacent to a second tube of ceramic-containing reinforcement material so that the first tube of ceramic-containing reinforcement material is in contact with the second tube of ceramic-containing reinforcement material,
wherein the rib-containing sections form interfaces that are non-planar with radially-adjacent sections of the core that extend between a leading edge and a trailing edge of the airfoil.

* * * * *